Dec. 24, 1963   V. K. MERRICK   3,115,317
AIRCRAFT WING AND TILTABLE DUCTED FAN
Filed March 9, 1962   2 Sheets-Sheet 1

Inventor
Vernon Keith Merrick
By
Dowell + Dowell
Attorneys

Dec. 24, 1963 V. K. MERRICK 3,115,317
AIRCRAFT WING AND TILTABLE DUCTED FAN
Filed March 9, 1962 2 Sheets-Sheet 2
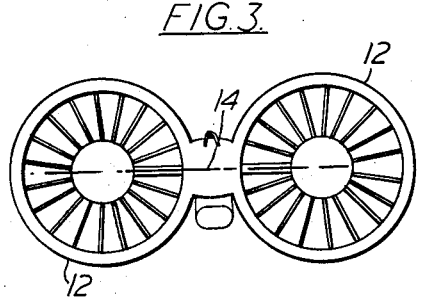
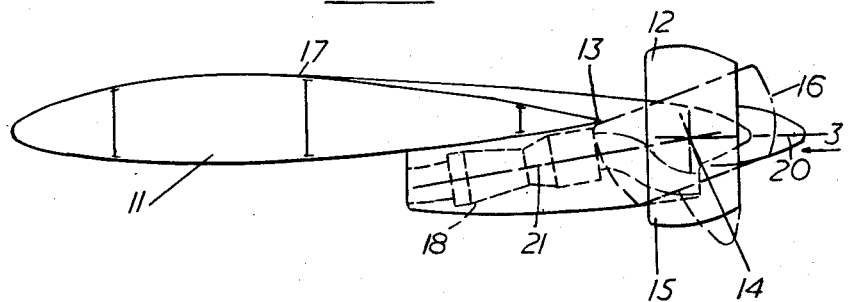
Inventor
Vernon Keith Merrick
By Dowell and Dowell
Attorneys

United States Patent Office 3,115,317
Patented Dec. 24, 1963

3,115,317
AIRCRAFT WING AND TILTABLE DUCTED FAN
Vernon Keith Merrick, Richmond, England, assignor to Hawker Siddeley Aviation Limited, Kingston-upon-Thames, England
Filed Mar. 9, 1962, Ser. No. 178,695
Claims priority, application Great Britain Mar. 9, 1961
7 Claims. (Cl. 244—12)

This invention relates to aircraft wings and more particularly to high lift wing arrangements.

Trailing edge flaps are widely employed to augment lift, it being conventional to change the section of aircraft wings to a high lift configuration by the deflection of such flaps when an aircraft is flying at comparatively low speeds, for example during take-off and landing. The principle has been extended by the employment of jet flap technique wherein a forced air flow discharge is provided at the trailing edge of a wing in addition to, or in place of, the mechanical flap arrangement. Thus there have been jet flap schemes in which the air flow is derived from gas turbine engines.

The present invention proposes an advantageous extension of the application of jet flap technique.

According to the invention, an aircraft wing is equipped with one or more blowers or fans located at its trailing edge and capable of being tilted downwards into a position in which the fan exhaust gives a jet flap effect.

With such an arrangement, the fans can have their axes disposed parallel to the aircraft fore-and-aft axis, or substantially so, during normal high speed flight and will then provide forward propulsive thrust. Upon landing or take-off the fans can be tilted down to obtain both the jet flap effect and a component of ordinary fan jet upthrust.

One scheme in accordance with the invention is illustrated, by way of example, in the accompanying drawings in which:

FIGURE 2 is a diagrammatic elevation taken on the line 2—2 of FIGURE 1, and

FIGURE 3 is a diagrammatic rear elevation, seen in the direction of the arrow 3 of FIGURE 2 of a pair of fans on the wing.

Figure 1:
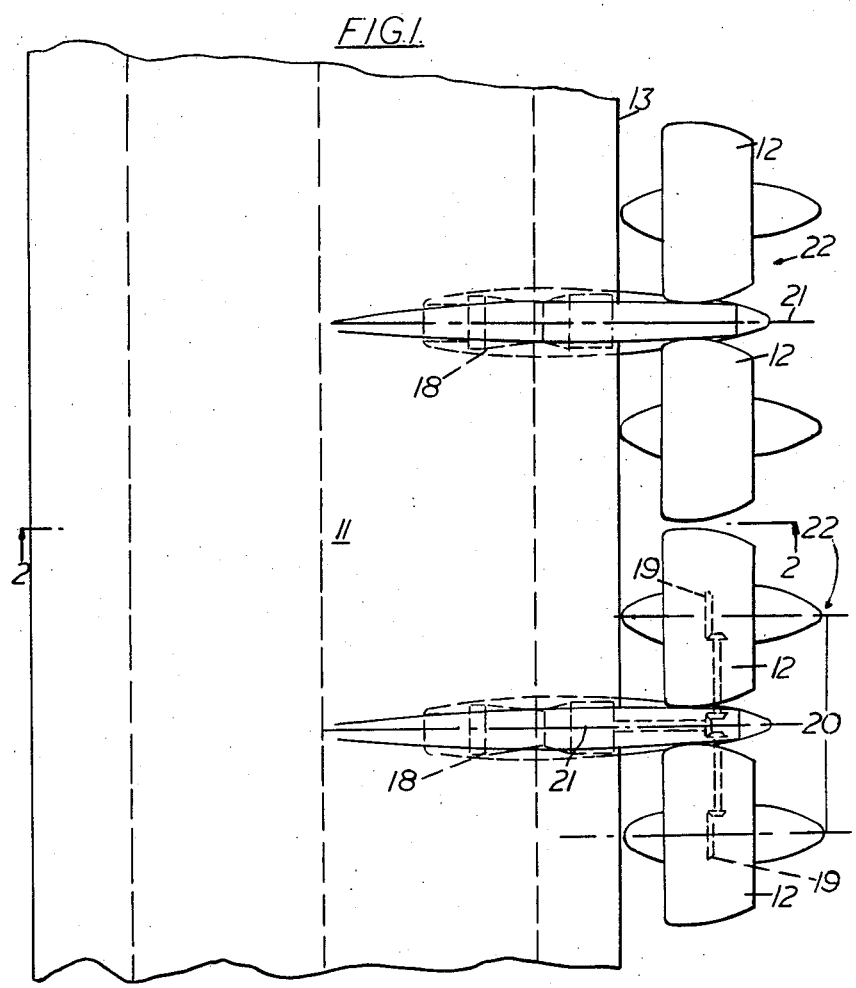
FIGURE 1 is a diagrammatic plan view of a portion of an aircraft wing.

The drawings show an aircraft wing 11 with a series of fans 12 mounted at intervals along its trailing edge 13. These fans can be tilted about an axis 14 (FIGURE 2) parallel to the trailing edge 13 from a position in which the fan rotor axes 20 are substantially horizontal, as shown in full lines in the drawings, to one in which the lip 15 of the fan duct entry is close to the trailing edge of the wing as seen in broken lines at 16 in FIGURE 2. In the latter position the fan jet exhaust acts as a thickjet flap and induces high lift on the wing 11 to supplement the vertical component of the fan thrust.

At take-off the fans 12 are in the downwardly tilted position 16. In that position of each fan rotor axis there will still be a recovery of horizontal thrust which can be used to accelerate the aircraft during the take-off. After take-off the fans are swivelled so that their rotor axes are in the direction of flight and they then provide the normal propulsive thrust. On landing, the fans are again deflected downwards to provide the high lift necessary with a low approach speed. The swivelling of the fans 12 can be effected, as is well understood, by power actuator means such, for example, as hydraulic jacks.

An attractive feature of this arrangement is that the fans themselves can have variable pitch blading to produce desired propulsion characteristics at different forward speeds. A particular advantage is that if, when the aircraft has touched down upon landing, the fan blades are put into reverse pitch so that the fan exhaust blows forwards over the upper surface 17 of the wing 11, not only does this produce a direct reversed thrust braking effect but also it tends to destroy the lift on the wing which increases the ground adhesion of the aircraft wheels and thereby improves the effectiveness of the wheel brakes.

The drawings show how the fans 12 can be arranged in pairs, each pair driven by a gas turbine engine 18 through appropriate shafting and gearing 19. Each engine 18 is mounted under the after portion of the wing 11 with its axis 21 lying midway between the rotor axes 20 of the two fans it drives and the engine exhaust passing between the fan casings. There can be as many assemblies of an engine and a pair of fans, indicated generally at 22, as is appropriate to the length of the wing, the arrangement producing a substantially continuous fan jet stream at the trailing edge of the wing. An advantage of the arrangement is that it allows for possible failure of an individual fan or engine. However, other arrangements of the fans and the means of driving them can be readily devised without departing from the scope of the invention.

It will be appreciated that in what has been hereinbefore described the jet flap effect is obtained without the complication of ducting air, that is to say either cold air or hot air from an engine, through the structure of the wing itself.

I claim:

1. An aircraft wing having a leading edge and a trailing edge, at least one fan mounted on the wing at said trailing edge so that the fan lies substantially wholly aft of but close up to said trailing edge, said fan comprising a fan duct and a fan rotor therein and being mounted for pivotal movement not exceeding about 90° upon a substantially horizontal axis which axis is behind said trailing edge and is substantially at right angles to the axis of rotation of the fan rotor, said pivotal movement occurring between two limiting positions in one of which limiting positions said axis of rotation extends substantially horizontally fore and aft and in the other of which limiting positions said axis of rotation is tilted into a condition of steep downward slope considered in the rearward-going direction, an aircraft propulsion engine mounted on the wing, and driving connections from said engine to said fan, whereby in the tilted condition said fan draws air from over the wing and discharges it rearwardly and downwardly of the wing.

2. A wing according to claim 1, wherein each fan is placed to the rear of the trailing edge and is mounted to swivel about an axis substantially parallel to the trailing edge between a position in which its rotor axis is substantially horizontal to a position in which its rotor axis is inclined steeply downward in the rearward direction.

3. A wing according to claim 1, wherein a plurality of fans are closely spaced along the trailing edge of the wing so as to form a substantially continuous jet flap.

4. A wing according to claim 3 wherein the fans are driven by wing-mounted gas turbine engines.

5. A wing according to claim 4, wherein the fans are driven in pairs, one engine to each pair of fans.

6. A wing according to claim 5, wherein the two fans of each pair are disposed symmetrically on either side of the axis of the engine that drives them, and the exhaust of the engine is directed rearwardly between the fan casings.

7. A wing according to claim 1, wherein the fans have variable pitch blading and can be put into reverse pitch.

References Cited in the file of this patent

UNITED STATES PATENTS

| | | |
|---|---|---|
| 2,812,912 | Stevens | Nov. 12, 1957 |
| 2,982,495 | Griffith | May 2, 1961 |
| 3,054,577 | Wolf | Sept. 18, 1962 |

FOREIGN PATENTS

| | | |
|---|---|---|
| 861,209 | Germany | Dec. 29, 1952 |